United States Patent [19]

Cumming

[11] Patent Number: 6,073,583
[45] Date of Patent: Jun. 13, 2000

[54] ESCAPE MECHANISM FOR WATER VESSEL

[76] Inventor: Joe C. Cumming, 39405 Metz Rd., King City, Calif. 93930

[21] Appl. No.: 08/549,428

[22] Filed: Oct. 27, 1995

[51] Int. Cl.⁷ ..................................................... A01K 7/00
[52] U.S. Cl. .................................................. 119/72; 119/61
[58] Field of Search ................... 119/72, 74, 61, 119/158, 702, 703, 704, 245–248, 253, 269

[56] References Cited

U.S. PATENT DOCUMENTS

| | | | |
|---|---|---|---|
| 3,141,442 | 7/1964 | Harris | 119/246 |
| 3,804,064 | 4/1974 | Kuneman et al. | 119/246 |
| 4,203,390 | 5/1980 | Brazelton | 119/702 |
| 4,291,646 | 9/1981 | Leonaggeo, Jr. | 119/702 |

*Primary Examiner*—Thomas Price
*Attorney, Agent, or Firm*—Dennis B. Haase

[57] ABSTRACT

A vessel for use in providing water, primarily, although not exclusively, for cattle grazing on open range land in which the vessel is provided with an escape mechanism for small animals that might become trapped in the vessel during the course of searching for water, comprising steps, or the like, ascending from the bottom of the vessel to the top, such that a trapped animal might extricate itself by going up the steps.

16 Claims, 2 Drawing Sheets

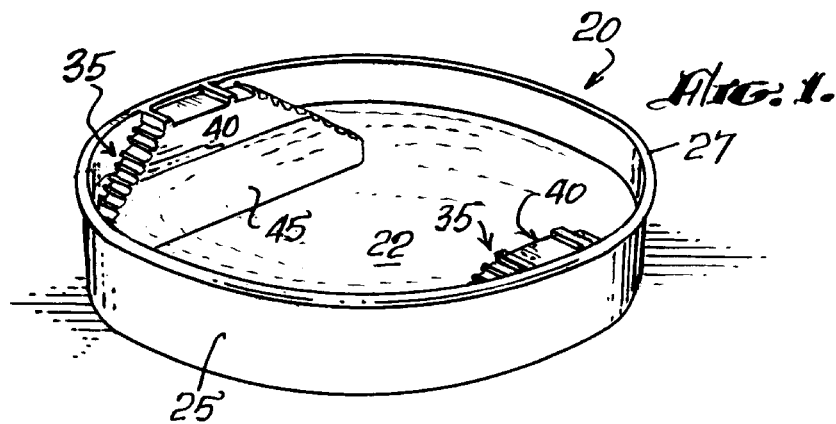
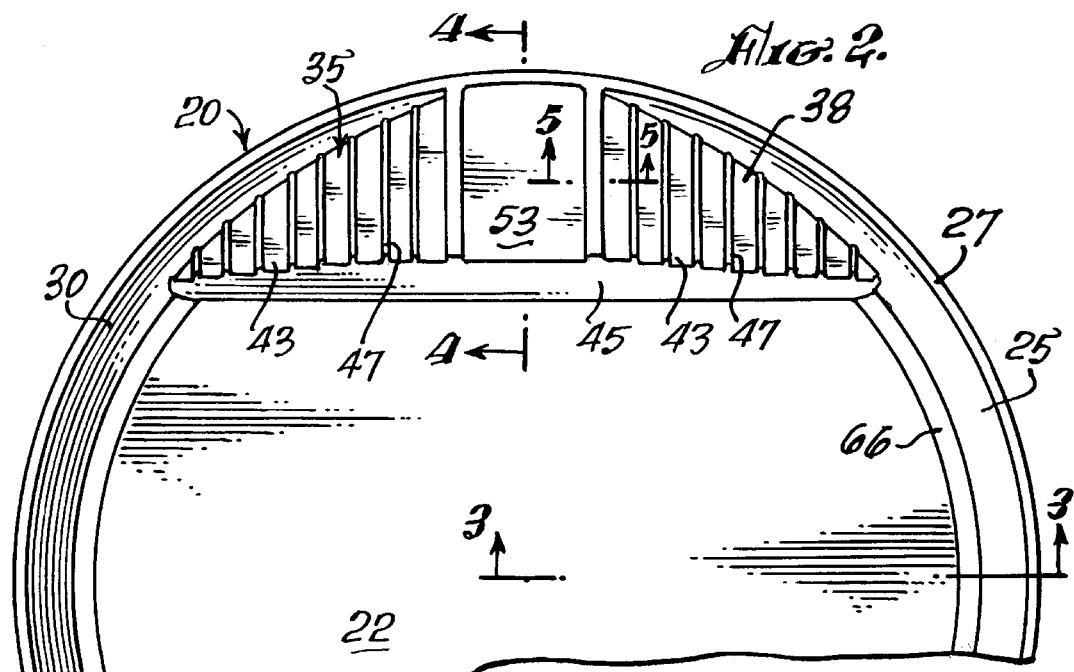
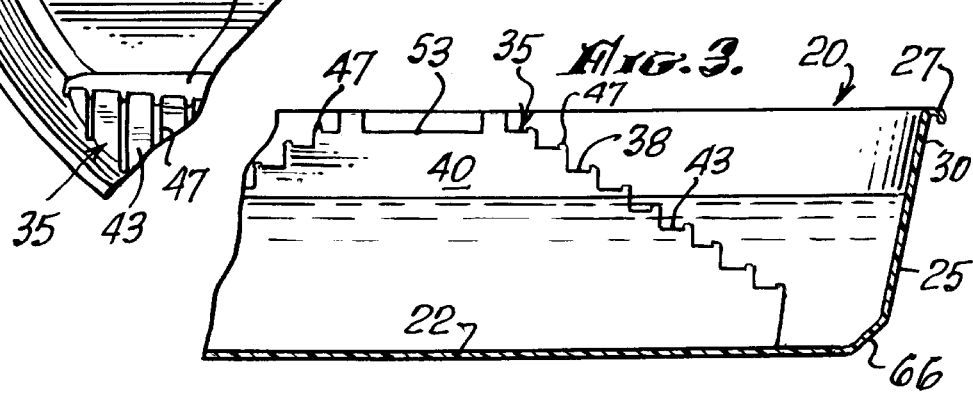

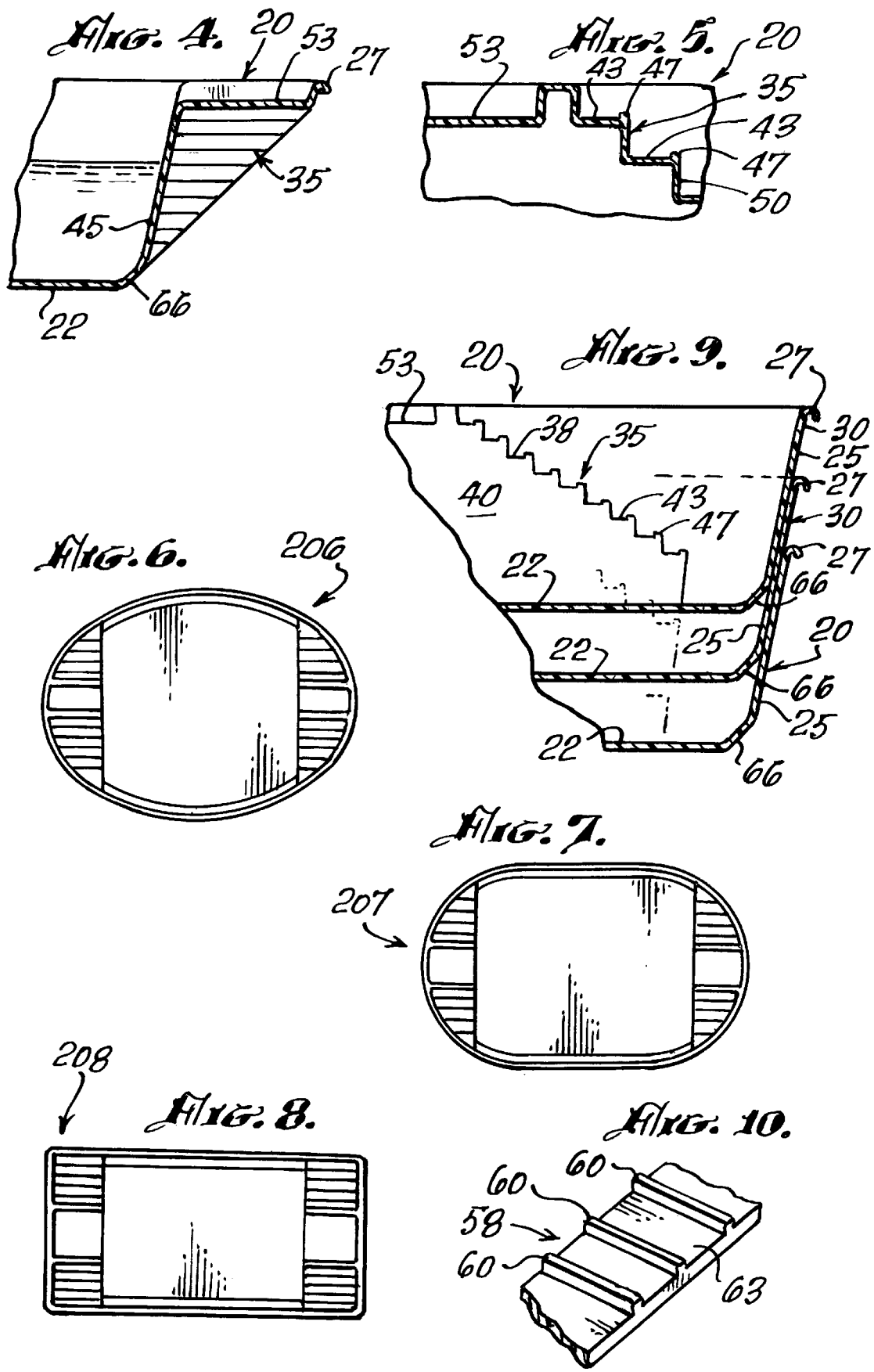

ESCAPE MECHANISM FOR WATER VESSEL

The present invention relates, generally, to relatively large vessels which provide for the storage and accessability of water for range animals, and more particularly for an escape mechanism for such vessels, which is intended to assist small animals that might inadvertently fall into such vessels during efforts to obtain water therefrom.

BACKGROUND OF THE INVENTION

FIELD OF THE INVENTION

Since the western United States was first settled, the propagation and raising of animals for food and clothing has been a major industry. In current times, such animals are more domesticated and less self reliant. Coincidently, natural resources, and in particular water, is in significantly less supply, particularly on the open range, than it once was.

In light of the lack of an abundant supply of water, for example, it is not uncommon for a rancher to provide water for his animals as they graze on the open range, much in the same manner as he would if those cattle were corralled.

The open pasture lands are typically shared with other animals, large and small, which animals exist essentially in a wild state and, as such, are conditioned to forage for food and water, while keeping an eye out for natural enemies. Particularly in drought periods, other animals, many of which are small in stature, seek out these captive water supplies, not only as a matter of convenience, but also because a watering trough may pose less danger from predators than might be found at the available watering holes.

Not surprisingly, many of the smaller animals may lean too far into the trough in their quest for water and fall into the trough itself. Such vessels, by their very nature, are straight sided, typically of galvanized metal, and afford little opportunity for escape, once such an animal has fallen in.

While concern for the trapped animal is an important concern, no less of a concern is for the water supply. Should the trapped animal be diseased, or should it expire in the water within the vessel, the water itself becomes tainted, and the consequences to the herd that is reliant on that supply is obvious.

While one solution might be to confine the trough in a manner which would inhibit unwanted access, the likelihood of denying access to the animals for which the supply is provided, makes such a solution insufficient and probably unworkable.

A more palatable solution, and the one which the present invention addresses, is to provide means for trapped animals to escape.

OVERVIEW OF THE PRIOR ART

Not surprisingly, the quantum of patented art on this subject is slim indeed. However, there is some available which, while not particularly on point, illustrates the state of art at the time of the invention.

Of interest, but not of particular importance, are four patents directed to steps in a swimming pool. Zars U.S. Pat. No. 3,086,220, Schankler U.S. Pat. No. 3,419,220, Boassey U.S. Pat. No. 3,744,198 and Witte U.S. Pat. No. 4,343,120 all represent variations on this same theme and are specific to a particular type of swimming pool construction, as distinguished from the generic concept.

Fagan U.S. Pat. No. 1,654,073 relates to the venerable grease pit, which was the forbearer of the automobile hoist, and, of course, illustrates access via steps.

The patents to Smiley, U.S. Pat. No. 488,778 and Barton U.S. Pat. No. 3,208,434 are of greater interest, in that they relate generally to animals and, more specifically, to bathing or dipping apparatus in which steps are provided for ingress and egress.

The reality of the situation is, however, that for a least a century farmers and ranchers have used watering troughs for their animals, and the natural and probable consequence of such use is that unwanted and uninvited animals inevitably find their way to, and into such vessels, to their eternal detriment, and yet, and until the advent of the present invention, there has been no way of permitting such unwanted guests from extricating themselves from a life threatening situation.

SUMMARY OF THE INVENTION

With the foregoing by way of establishing the environment in which the present invention has particular, although not exclusive, utility, it is a primary objective of the present invention to provide means for animals trapped in a watering trough to escape a potentially life threatening situation.

It is another objective, related to the objective set forth above, to provide a watering trough, or vessel, primarily for use on the open range, which includes an escape mechanism for animals inadvertently trapped therein, thereby preserving, to the extent possible, the needless death of such animals.

Yet another objective of the present invention is to inhibit the spread of illness and disease from a tainted water supply that becomes tainted by virtue of the expiration, by drowning, or otherwise, of an animal that is trapped in the supply while attempting to get a drink and cannot otherwise escape the situation.

The foregoing, as well as other objects and advantages of the present invention, will become apparant from a reading of the following detailed description, in conjunction with the drawings, wherein:

THE DRAWINGS

FIG. 1, is a perspective view of a typical vessel for holding water, modified in accordance with the present invention;

FIG. 2, is an enlarged plan view, fragmented to illustrate certain details of construction with greater clarity;

FIG. 3, is a partially sectioned side elevation taken along lines 3–3 of FIG. 2;

FIG. 4, is another partial side elevation, taken along line 4–4 of FIG. 2, sectioned to illustrate other aspects of the novel construction;

FIG. 5, is still another partial section, in side elevation taken along line 5–5 of FIG. 2;

FIGS. 6, 7 and 8, are illustrative of various configurations of vessels such as that of the present invention, demonstrating the adaptability of the invention;

FIG. 9, illustrates the features of the invention that make vessels constructed in accordance with the teachings of the invention, stackable; and, FIG. 10, illustrates an alternative to the steps of the principal embodiment, in the nature of a ramp, with blocks.

DETAILED DESCRIPTION OF A PREFERRED EMBODIMENT

With reference now to the drawings, and initially to FIG. 1, a vessel 20 is illustrated in perspective. The vessel 20 comprises a base member 22 having a geometric configuration, in this case a circle, and an upstanding side wall 25, which is secured to the base in any one of several well known ways, so as to provide a fluid tight seal therebetween. A lip 27 is formed, or otherwise provided along the upper edge 30 of the side wall, more clearly seen in FIG. 3.

It is readily appreciated among farmers and ranchers, and those familiar with the business of raising animals for food and fibre, that water troughs 20, are not, in all cases, cylindrical. Indeed, depending on the cost of manufacture, and transporting such units, they may be any number of well known configurations such as the ellipsoid vessel 206 of FIG. 6, the oval configuration 207 of FIG. 7, or the rectangular configuration 208 of FIG. 8.

The essence of the present invention is found in the provision of means whereby small animals who, in search of water, may find their way to a water trough or vessel 20, and in an effort to drink therefrom, fall into the vessel, may extricate themselves from this life threatening situation.

Thus, in furtherance of this aspect of the invention, an escape mechanism 35 is provided in the trough or vessel 20, and may assume one of several forms, as will be described hereinafter.

As seen in FIG. 1, the escape mechanism may take the form of a stairway 38. As shown particularly in FIGS. 2, 3 through 5 and 9, the stairway 38 is secured to the side wall 25 of the vessel 20 in any well known manner and may even be formed integrally with it. The stairway extends upwardly from the base member to the top of the side wall.

There may be one, or two, or even more stairways depending on the size of the vessel. For most applications, however, and in a vessel that is approximately eight feet in diameter, or along a side, and perhaps two feet high, one double stairway, such as the one illustrated at 40 in FIG. 3, has proven to be entirely adequate.

By use of a pair of opposed stairways to define a double stairway, a trapped animal will find relief from its predicament more quickly, and, thus, reduce the panic factor which is the inevitable consequence of being trapped in the vessel. Clearly, however, a single stairway 38 will suffice as minimum protection for accomplishing the purpose of the invention.

In order to provide maximum coverage for the size and shape of the vessel 20, stairways 38, or double stairways 40, are strategically placed, preferably at opposite sides of the vessel to provide access to them at a minimum distance from the most remote part of the vessel.

Each stairway 35 and 40 is provided with a series of steps 43, which ascend in series from the bottom of the tank. The steps are supported by a support member 45. In order to provide sure footing, particularly for animals having cloven hooves, an upstanding rib 47, best seen in FIG. 5, is formed, or otherwise provided at the leading edge 50, of each step, and is so positioned as to provide a resistance to any slippage of an escaping animal's foot.

As seen in the FIG. 3 configuration, where the double stairway is illustrated, a platform 53 is provided. The platform is disposed at the top of the side wall where each individual stairway comes together to form a double stairway. A similar platform may also be provided where a single stairway 35 is employed. The platform 53, which is essentially level, provides the escaping animal with reassurance that it has reached safety, and, secondarily, it provides a surface from which it can jump free of the vessel.

The stairways 35 and 40 provide secondary benefits in that the vessel may be cleaned, and any plumbing that might be used in the filling system can be serviced by humans by convenient use of the stairways for ingress and egress to the interior of the vessel.

FIG. 10 is illustrative of an alternative to the stairways 38 and 40. Specifically, a ramp 58 is shown, partially fragmented, but readily understandable as a more simplistic form of escape mechanism 35. The ramp 58 may be secured to the sidewall 25 of the vessel 20, or supported in any well known manner, on the base member 22.

Optionally, in order to provide additional traction for an escaping animal, blocks 60 are secured in spaced relation along the surface 63 of the ramp. The ramp 58, as in the case of stairways, may be single or double without departure from the invention.

It has been found that costs governing the manufacture of vessels such as those illustrated here are such that, at least in smaller sizes, molding, as distinguished from constructing, often provides the most economical approach. For this purpose, and in keeping with this aspect of the invention, the intersection of the base member 22 and the sidewall 25 is beveled as at 66, and the side wall extends upwardly from the bevel at an acute angle.

By using these design features, molded vessels, as well as constructed vessels, may be stacked for storage and shipping, and readily separated for use.

By means of this relatively simple invention many problems and concerns surrounding the watering or cattle, or the like, on the range and elsewhere in an environment in which predatory and other animals in search of water might encounter a watering trough, are resolved. The resolution is one which preserves the lives of trapped animals, and the health and well being of the cattle or other animals for which the water was originally intended.

Having thus described, in detail, a preferred embodiment of my invention, and certain alternative embodiments, what is claimed is:

1. A vessel for use in providing water for cattle grazing on the open range, comprising a base member, a side wall, said side wall extending upwardly from said base member, said base member being connected to said side wall in water tight relation, said base and said side wall together defining an enclosure for the retention of water, or the like, an escape mechanism in said vessel, said escape mechanism being attached to said side wall and extending from said base member to the top of said side wall at a predetermined angle such that an animal falling into said vessel may traverse said escape mechanism to exit from said vessel.

2. The vessel as described in claim 1, wherein said vessel is of a geometric shape.

3. The vessel as described in claim 1, wherein said vessel is circular in shape.

4. The vessel as described in claim 1, wherein said vessel is oval in shape.

5. The vessel as described in claim 1, wherein said vessel is rectangular in shape.

6. The vessel as described in claim 1, wherein said escape mechanism comprises at least one ramp extending upwardly from said base member to the top of said side wall.

7. The vessel as described in claim 6, wherein a series of blocks are provided, said blocks being affixed in serial relationship along said at least one said ramp.

8. The vessel as described in claim 1, wherein said escape mechanism comprises a stairway extending upwardly from said base member to the top of said side wall.

9. The vessel as described in claim 8, wherein said stairway comprises a series of successive steps extending upwardly from said base member to the top of said side wall.

10. The vessel as described in claim 9, each said step having an upstanding rib disposed thereon.

11. The vessel as described in claim 8, wherein said stairways join to define a platform at the top of said side wall.

12. The vessel as described in claim 1, wherein said escape mechanism comprises a pair of ramps, said ramps extending upwardly from said base member and being joined at the top of said side wall.

13. The vessel as described in claim 12, wherein said ramps join to define a platform at the top of said side wall.

14. The vessel as described in claim 1, wherein said escape mechanism comprises a pair of stairways, together defining a double stairway extending upwardly from said base member and being joined at the top of said side wall.

15. The vessel as described in claim 1, wherein said base member and said side wall is tapered at the point of juncture.

16. The vessel as described in claim 1, wherein a pair of escape mechanisms are disposed opposite one another in said vessel.

* * * * *